US009686795B1

(12) United States Patent
Prock et al.

(10) Patent No.: US 9,686,795 B1
(45) Date of Patent: Jun. 20, 2017

(54) METHOD AND SYSTEM FOR DETERMINING WHEN TO SCAN FOR NEIGHBOR SECTORS HAVING A DIFFERENT FREQUENCY ASSIGNMENT

(71) Applicant: Sprint Spectrum L.P., Overland Park, KS (US)

(72) Inventors: John W. Prock, Peculiar, MO (US); Siddharth S. Oroskar, Overland Park, KS (US); Jasinder P. Singh, Olathe, KS (US); Maulik K. Shah, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 81 days.

(21) Appl. No.: 14/867,433

(22) Filed: Sep. 28, 2015

Related U.S. Application Data (63) Continuation of application No. 13/785,846, filed on Mar. 5, 2013, now Pat. No. 9,173,164.

(51) Int. Cl.
*H04L 12/28* (2006.01)
*H04W 72/04* (2009.01)
(Continued)

(52) U.S. Cl.
CPC ..... *H04W 72/0453* (2013.01); *H04J 13/0022* (2013.01); *H04W 48/08* (2013.01); *H04W 72/048* (2013.01)

(58) Field of Classification Search
CPC ............. H04W 72/0453; H04W 48/08; H04W 72/048; H04J 13/0022
See application file for complete search history.

(56) References Cited

U.S. PATENT DOCUMENTS 6,285,874 B1 * 9/2001 Magnusson ........... H04W 16/00
455/423
6,654,362 B1 11/2003 Palamara
(Continued)

OTHER PUBLICATIONS

3rd Generation Partnership Project 2, "Band Class Specification for cdma2000 Spread Spectrum Systems, Revision E," 3GPP2 C.S0057-E, Version 1.0 (Oct 2010).

*Primary Examiner* — Afshawn Towfighi (57) ABSTRACT

A wireless network includes first-configuration sectors with a first frequency assignment and second-configuration sectors with a second frequency assignment. When served by a first-configuration sector that borders a second-configuration sector, the mobile station receives (i) a neighbor list that identifies neighbor sectors of the primary sector, including the second-configuration sector, (ii) a primary-sector reference distance between a transmitter for the primary sector and a reference point in the primary sector, and (iii) a neighbor-sector reference distance between a transmitter for the second-configuration sector and the reference point. Based on the reference distances, the mobile station calculates a border distance between the primary sector's transmitter and a border between the sectors. The mobile station compares its distance from the primary sector's transmitter to the primary-sector reference distance and/or border distance. Based on the comparison, the mobile station selects a scanning algorithm that determines when to scan for the second-configuration sector.

9 Claims, 9 Drawing Sheets (51) Int. Cl.
  *H04J 13/00* (2011.01)
  *H04W 48/08* (2009.01)

(56) References Cited

U.S. PATENT DOCUMENTS

| | | |
|---|---|---|
| 6,980,805 B2 | 12/2005 | Matsumoto et al. |
| 7,289,810 B2 | 10/2007 | Jagadeesan et al. |
| 7,693,521 B1 | 4/2010 | Ribas et al. |
| 7,840,227 B2 | 11/2010 | Kahlert et al. |
| 8,249,596 B2 | 8/2012 | Shaffer et al. |
| 9,173,164 B1 | 10/2015 | Prock et al. |
| 2006/0233138 A1 | 10/2006 | Park |
| 2012/0257597 A1 | 10/2012 | Zhang et al. |
| 2013/0109379 A1* | 5/2013 | Shi ................. H04W 48/16 455/434 |
| 2014/0080510 A1* | 3/2014 | Morgan ............. G01S 5/02 455/456.1 |
| 2015/0080003 A1* | 3/2015 | Sadek .............. H04W 72/048 455/452.1 |
| 2015/0105071 A1* | 4/2015 | Yamine ............ H04W 48/04 455/434 |

\* cited by examiner

METHOD AND SYSTEM FOR DETERMINING WHEN TO SCAN FOR NEIGHBOR SECTORS HAVING A DIFFERENT FREQUENCY ASSIGNMENT

CROSS-REFERENCE TO RELATED APPLICATION

This application is a continuation of patent application Ser. No. 13/785,846, filed Mar. 5, 2013, which is hereby incorporated herein by reference.

BACKGROUND

Wireless communication networks can be configured to use various frequency bands for downlink communications (transmissions to mobile stations) and various frequency bands for uplink communications (transmissions from mobile stations). More particularly, a wireless communication network may use uplink and downlink frequency bands in accordance with a standardized band class specification. For example, CDMA2000 standards define twenty-two different band classes, designated "Band Class 0" through "Band Class 21." See $3^{rd}$ Generation Partnership Project 2, "Band Class Specifications for cdma2000 Spread Spectrum Systems, Revision E," 3GPP2 C.S0057-E, Version 1.0 (October 2010).

In some instances, a wireless communication network may include a border area in which sectors that use different band classes border one another. However, in order to conserve battery life, a mobile station operating in such a border area may scan for only one of the band classes. As a result, a mobile station may originate a call via a sector that uses the scanned band class, even though a sector that uses a different band class may provide better wireless coverage.

Overview

In a first aspect, example embodiments provide a method for a mobile station. The mobile station receives a primary-sector reference distance between a transmitter for a primary sector serving the mobile station and a reference point in the primary sector. The mobile station also receives a neighbor list that identifies a plurality of neighbor sectors of the primary sector, the plurality of neighbor sectors including one or more same-configuration sectors having a same frequency assignment as the primary sector and one or more different-configuration sectors having a different frequency assignment than the primary sector. In addition, the mobile station receives a neighbor-sector reference distance between the reference point and a transmitter for a different-configuration sector in the neighbor list. The mobile station calculates a border distance between the transmitter for the primary sector and a border between the primary sector and the different-configuration sector based on the primary-sector reference distance and the neighbor-sector reference distance. The mobile station determines a mobile station distance of the mobile station from the transmitter for the primary sector. The mobile station classifies the mobile station distance based on at least one of the primary-sector reference distance or the border distance. The mobile station selects a scanning algorithm from among at least a first scanning algorithm, a second scanning algorithm, and a third scanning algorithm, based on the classified mobile station distance. The mobile station determines when to scan for a pilot signal transmitted by the different-configuration sector, based on the selected scanning algorithm.

In a second aspect, example embodiments provide a mobile station. The mobile station includes a first receiver for receiving spread spectrum signals in a first frequency band, a second receiver for receiving spread spectrum signals in a second frequency band, a processor, data storage, and program instructions stored in the data storage and executable by the processor to cause the mobile station to perform functions. The functions include: (a) receiving a primary-sector reference distance between a transmitter for a primary sector serving the mobile station and a reference point in the primary sector, wherein the primary sector transmits spread spectrum signals in the first frequency band; (b) receiving a neighbor-sector reference distance between the reference point and a transmitter for a different-configuration sector that borders the primary sector, wherein the different-configuration sector transmits spread spectrum signals in the second frequency band; (c) calculating a border distance between the transmitter for the primary sector and a border between the primary sector and the different-configuration sector based on the primary-sector reference distance and the neighbor-sector reference distance; (d) determining a mobile station distance of the mobile station from the transmitter for the primary sector; (e) classifying the mobile station distance based on a comparison of the mobile station distance to at least one of the primary-sector reference distance or the border distance; (f) selecting a scanning algorithm from among at least a first scanning algorithm, a second scanning algorithm, and a third scanning algorithm, based on the classified mobile station distance; and (g) controlling the second receiver in accordance with the selected scanning algorithm.

In a third aspect, example embodiments provide a method for a wireless network. The wireless network includes a plurality of first-configuration sectors that have a first frequency assignment and a plurality of second-configuration sectors that have a second, different assignment. The plurality of first-configuration sectors include a plurality of border sectors that border at least one of the second-configuration sectors and a plurality of non-border sectors that do not border any of the second-configuration sectors. The method involves determining that a primary sector serving a mobile station is one of the border sectors, transmitting to the mobile station a primary-sector reference distance corresponding to a distance between a reference point in the primary sector and a transmitter for the primary sector, and transmitting to the mobile station a neighbor list that identifies a plurality of neighbor sectors of the primary sector The plurality of neighbor sectors includes one or more first-configuration sectors and one or more second-configuration sectors. The neighbor list further includes for each of the one or more second-configuration sectors a respective neighbor-sector reference distance corresponding to a respective distance between the reference point in the primary sector and a respective transmitter for the second-configuration sector.

DETAILED DESCRIPTION

1. Introduction

The inventors propose methods and systems for determining when a mobile station should scan for signals from a sector that transmits in a different frequency band than the primary sector serving the mobile station. In an example approach, the mobile station determines a mobile station distance from the primary sector's transmitter, classifies the mobile station distance into one of a plurality of distance ranges, and selects a scanning algorithm based on the distance range. The mobile station then applies the selected scanning algorithm to determine when to scan for signals in the different frequency band.

The mobile station may classify the mobile station distance based on distance information that the mobile station receives from the wireless network. For example, when the mobile station is served by a primary sector that uses a first frequency band and that borders a different-configuration sector that uses a second frequency band, the mobile station may receive from the primary sector (i) a neighbor list that identifies neighbor sectors of the primary sector, including the different-configuration sector, (ii) a primary-sector reference distance between a transmitter for the primary sector and a reference point in the primary sector, and (iii) a neighbor-sector reference distance between a transmitter for the different-configuration sector and the reference point. Based on the reference distances, the mobile station may calculate a border distance between the primary sector's transmitter and a border between the primary sector and different-configuration sector. The mobile station may then compare its distance from the primary sector's transmitter to the primary-sector reference distance and/or border distance. Based on the comparison, the mobile station may select a scanning algorithm that determines when to scan for the different-configuration sector.

2. Example Wireless Network

Figure 1:
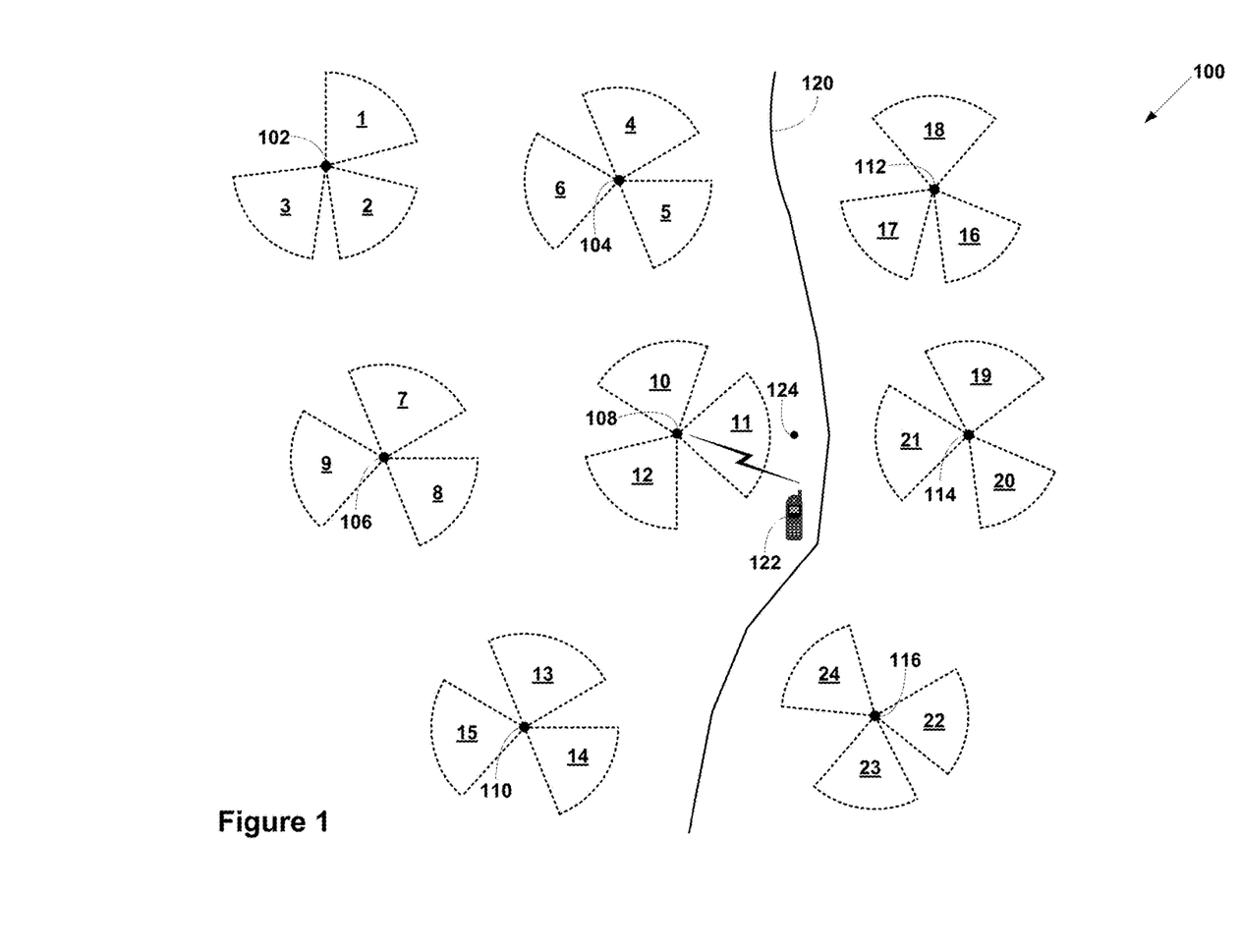
FIG. 1 is a diagram illustrating an arrangement of sectors in a wireless network, in accordance with an example embodiment.

FIG. 1 illustrates an example wireless network 100 that includes first-configuration sectors 1-15 that have a first frequency assignment and second-configuration sectors 16-24 that have a second frequency assignment. The different frequency assignments could involve different frequency bands, different band classes, different band subclasses, different frequency blocks, different frequency channels, or combinations thereof. For example, first-configuration sectors 1-15 may use Band Class 10 (BC10), in which base stations transmit at frequencies in the 800 MHz range, while second-configuration sectors 16-24 use Band Class 1 (BC1), in which base stations transmit at frequencies in the 1900 MHz range. It is also possible for first-configuration sectors 1-15 and second-configuration sectors 16-24 to have different frequency assignments while having at least one band class in common. For example, first-configuration sectors 1-15 may support both BC1 and BC10, while second-configuration sectors 16-24 may support only BC1. Other differences in the frequency assignments of first-configuration sectors 1-15 and second-configuration sectors 16-24 are possible as well.

Sectors 1-24 may be configured to communicate with mobile stations using spread spectrum signals, for example, in accordance with CDMA2000 standards. Alternatively, sectors 1-24 may be configured to communicate with mobile stations using other types of wireless signals and/or in accordance with other wireless communication protocols.

First-configuration sectors 1-15 and second-configuration sectors 16-24 may be part of the wireless coverage areas provided by base transceiver stations (BTSs). For example, the wireless coverage area provided a BTS may be called a "cell," and each cell may be azimuthally divided into multiple "sectors" (e.g., three sectors) through the use of directional antennas. Each BTS may include a respective set of one or more transmitters and one or more receivers for each sector. As shown, BTS 102 defines sectors 1-3, BTS 104 defines sectors 4-6, BTS 106 defines sectors 7-9, BTS 108 defines sectors 10-12, BTS 110 defines sectors 13-15, BTS 112 defines sectors 16-18, BTS 114 defines 19-21, and BTS 116 defines sectors 22-24. It is to be understood that the illustration of sectors 1-24 in FIG. 1 is schematic only. In particular, FIG. 1 is intended to illustrate the general directionality of each sector, rather than the precise azimuthal extent, range, or shape of any sector.

In the example shown in FIG. 1, first-configuration sectors 1-15 and second-configuration sectors 16-24 provide coverage in different areas of wireless network 100. In particular, a border 120 can be defined between areas covered by first-configuration sectors 1-15 and areas covered by second-configuration sectors 16-24. As shown, BTSs 102, 104, 106, 108, and 110, which define first-configuration sectors 1-15, are located on one side of border 120, and BTSs 112, 114, and 116, which define second-configuration sectors 16-24, are located on the other side of border 120.

Sectors that are adjacent to border 120 may be described as "border sectors," whereas sectors that are not adjacent to border 120 may be described as "interior sectors" or "non-border sectors." Thus, in the arrangement shown in FIG. 1, sectors 4, 5, 11, and 14 may be the border sectors among first-configuration sectors 1-15 and sectors 1-3, 6-10, 12, 13, and 15 may be the interior sectors among first-configuration sectors 1-15. Further, sectors 17, 21, and 24 may be the border sectors among second-configuration sectors 16-24 and sectors 16, 18, 19, 20, 22, and 23 may be the interior sectors among second-configuration sectors 16-24.

A mobile station may move from one sector to another in wireless network 100. In so doing, the mobile station may undergo a handoff that adds and/or removes one or more sectors in the mobile station's active set. The handoff could be either an active-mode handoff when the mobile station is engaged in a call or an idle-mode handoff when the mobile station is not engaged in a call. The addition of a sector to the mobile station's active set may occur when the mobile station detects a signal strength of a pilot signal from the sector that exceeds a predetermined add threshold (T_add). The removal of a sector to the mobile station's active set may occur when the mobile station detects a signal strength of a pilot signal from the sector that is less than a predetermined drop threshold (T_drop). In this way, a mobile station may maintain an active set of one or more sectors. Typically, however, one of the sectors in the active set is a primary sector that the mobile station monitors to receive messages, such as page messages. The primary sector could be, for example, the sector in the active set that has the highest signal strength measured by the mobile station.

To find sectors that can be added to the active set, the mobile station may scan for pilot signals transmitted by one or more sectors that are identified in a neighbor list. The mobile station may receive the neighbor list from wireless network 100 at various times, such as when a sector is added or removed from the mobile station's active set. For example, when a sector becomes the mobile station's primary sector, the mobile station may receive from the primary sector a neighbor list that identifies a plurality of sectors neighboring the primary sector. The mobile station may then scan for pilot signals from the sectors in the neighbor list. If, as a result of the scanning, the mobile station finds a sector with a signal strength that exceeds the T_add threshold, the sector may be added to the mobile station's active set.

FIG. 1 illustrates an example in which a mobile station 122 is located near border 120 and is being served by first-configuration sector 11 as the mobile station's primary sector. Mobile station 122 may receive from sector 11 a neighbor list that identifies one or more first-configuration sectors that neighbor sector 11. Since first-configuration sector 11 is a border sector that borders second-configuration sectors (i.e., second-configuration sectors 17, 21, and 24), the neighbor list may also identify one or more second-configuration sectors that neighbor sector 11. However, because the second-configuration sectors have a different frequency assignment than the mobile station's primary sector, scanning for the second-configuration sectors in the neighbor list can be a significant drain on the mobile station's battery. For example, mobile station 122 may include a first receiver for receiving signals from first-configuration sectors and a second receiver for receiving signals from second-configuration sectors. As a result, scanning for signals from both first-configuration sectors and second-configuration sectors may involve mobile station 122 operating two receivers instead of one.

In order to conserve battery power, when mobile station 122 receives from first-configuration sector 11 a neighbor list that identifies both first-configuration sectors and second-configuration sectors, mobile station 122 may determine which of the identified second-configuration sectors, if any, to scan for. Mobile station 122 may make this determination based on its distance to the transmitter for first-configuration sector 11 (i.e., BTS 108).

For example, mobile station 122 may compare its distance to BTS 108 to the distance between BTS 108 and a reference point 124 in sector 11 and/or the distance between BTS 108 and border 120. Reference point 124 could correspond to a centroid of sector 11, or reference point 124 could be selected in some other way. Mobile station 122 may then apply a particular scanning algorithm based on the comparison. In particular, mobile station 122 may apply a first scanning algorithm if its distance to BTS 108 is less than that of reference point 124, a second scanning algorithm if its distance to BTS 108 is greater than that of reference point 124 but less than that of border 120, and a third scanning algorithm if its distance to BTS 108 is greater than that of border 120. The different scanning algorithms may have different criteria for determining when mobile station 122 should scan for a second-configuration sector (e.g., sector 21), such that mobile station 122 is more like to scan for the second-configuration sector when mobile station 122 is relatively distant from BTS 108 (e.g., more distant than border 120) and less likely to scan for the second-configuration sector is relatively close to BTS 108 (e.g., closer than reference point 124).

3. Example Methods

Figure 2:
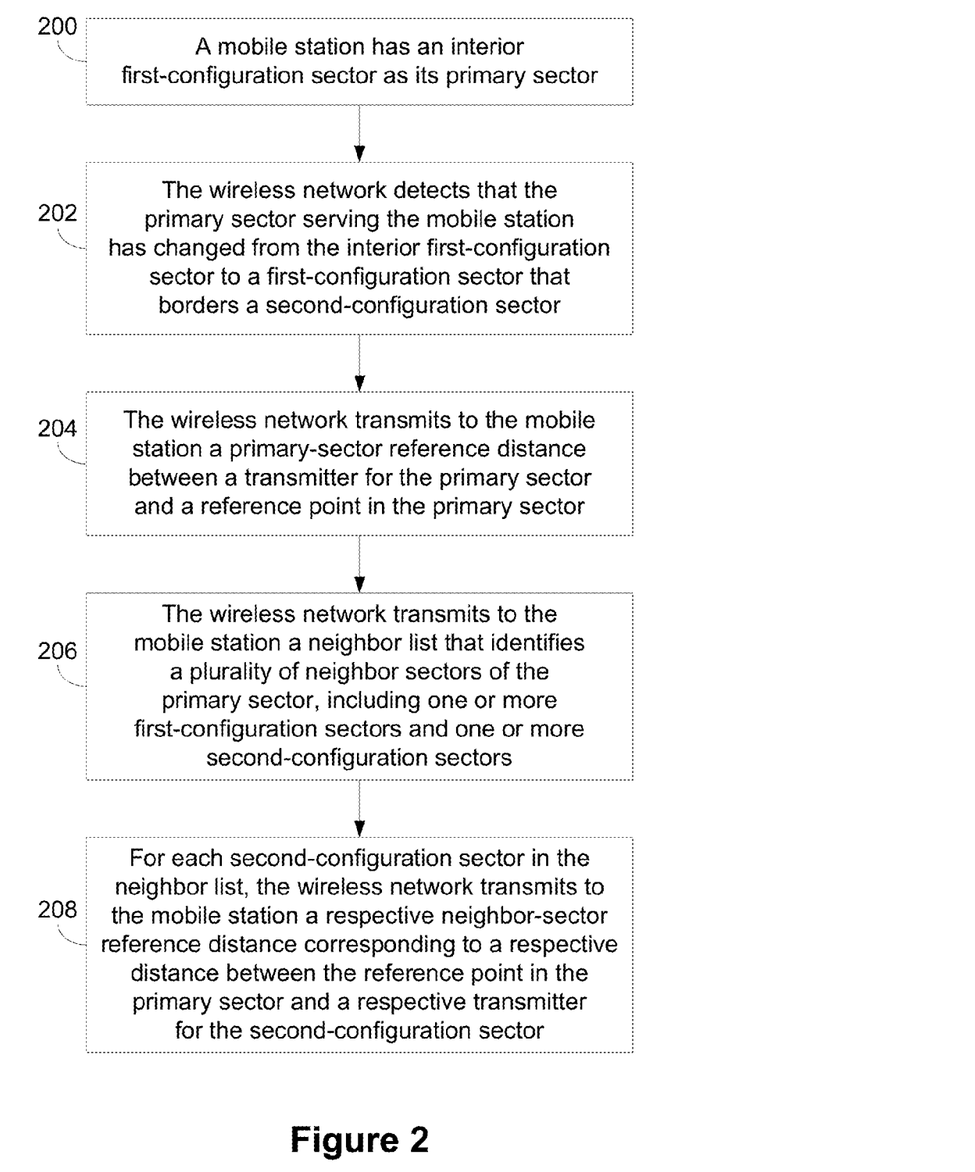
FIG. 2 is a flow chart illustrating a method for a wireless network, in accordance with an example embodiment.

FIG. 2 is a flow chart of an example method that a wireless network may apply when a mobile station has a border sector as its primary sector. In this example, the wireless network includes first-configuration sectors and second-configuration sectors, such as wireless network 100 shown in FIG. 1, and the primary sector is one of the first-configuration sectors.

Initially, a mobile station has an interior first-configuration sector (e.g., sector 12) as its primary sector, as indicated by block 200. At some point, the wireless network detects that the primary sector serving the mobile station has changed from the interior first-configuration sector to a first-configuration sector that borders a second-configuration sector (e.g., sector 11), as indicated by block 202. In response, the wireless network transmits to the mobile station a primary-sector reference distance between a transmitter for the primary sector (e.g., BTS 108) and a reference point in the primary sector (e.g., reference point 124), as indicated by block 204. The wireless network also transmits to the mobile station a neighbor list that identifies a plurality of neighbor sectors of the primary sector, including one or more first-configuration sectors and one or more second-configuration sectors, as indicated by block 206. For each second-configuration sector in the neighbor list, the wireless network also transmits to the mobile station a respective neighbor-sector reference distance corresponding to a respective distance between the reference point in the primary sector and a respective transmitter for the second-configuration sector, as indicated by block 208.

The transmissions discussed above for blocks 204-206 could be three (or more) separate transmissions to the mobile station, or the transmissions could be consolidated into a fewer number of transmissions. For example, the neighbor list that the wireless network transmits to the mobile station could also include the primary-sector reference distance and the neighbor-sector reference distances. Table 1 below illustrates the information that may be included in such a neighbor list message for an example in which sector 11 of wireless network 100 is the primary sector.

TABLE 1

| Primary PN Offset | Reference Distance | PN Increment |
|---|---|---|
| 11 | 4 | 1 |

| Neighbor PN Offset | Reference Distance | Configuration Code |
|---|---|---|
| 10 | 5 | 0 |
| 12 | 6 | 0 |
| 21 | 10 | 2 |
| 24 | 14 | 2 |
| 5 | 16 | 0 |

TABLE 1-continued

| 17 | 17 | 2 |
|----|----|----|
| 7  | 0  | 0 |
| 8  | 0  | 0 |
| 13 | 0  | 0 |
| 14 | 20 | 0 |

In this example, the sectors transmit spread spectrum signals that are spread with a with pseudo-noise (PN) code sequence at a particular chip rate, such as 1.2288 Mchips/second. In different sectors, the beginning of the PN code sequence is time offset from a reference time by different amounts. The time offsets may be characterized as different PN offsets. Thus, as shown in Table 1, the neighbor list may identify the primary sector by its PN offset of 11 and may identify the neighbor sectors by their respective PN offsets. For purposes of illustration, the reference numbers of the sectors shown in FIG. 1 correspond to their PN offsets.

As shown in Table 1, the neighbor list includes a reference distance for the primary sector and for some (but not all) of the neighbor sectors. The reference distance for the sector can be the distance between the sector's transmitter and the reference point in the primary sector (e.g., reference point 124 in sector 11). The reference distance can be given as a number of chips, in which each chip is the distance that the spread spectrum signal travels between successive chips in the PN code sequence. With a chip rate of 1.2288 Mchips/second, each chip represents a propagation distance of about 244 meters. Thus, in the example of Table 1, the primary-sector reference distance between the transmitter for the primary sector (e.g., BTS 108) and reference point 124 is 4 chips (about 976 meters).

The reference distances for sectors 10 and 12 are somewhat higher than the reference distance for sector 11, even though these sectors are in the same cell and have transmitters at the same location (BTS 108). The higher reference distances for sectors 10 and 12 can be used to account for the effects of multipath propagation.

The reference distances for sectors 7, 8, and 13 are given as 0 because these sectors are interior sectors that do not border any of the second-configuration sectors. Thus, the neighbor list may not include reference distances for interior sectors, except for the interior sectors that are in the same cell as the primary sector (sectors 10 and 12 in the example of Table 1). In this way, the neighbor list may indicate which of the first-configuration sectors are border sectors and which are interior (non-border) sectors.

The neighbor list may also indicate which of the neighbor sectors have the same frequency assignment as the primary sector (i.e., which neighbors are first-configuration sectors) and which of the neighbor sectors have a different frequency assignment than the primary sector (i.e., which neighbors are second-configuration sectors). This can be indicated by configuration codes. In the example of Table 1, a configuration code of "0" indicates the same frequency assignment as the primary sector, whereas a configuration code of "2" indicates a different frequency assignment.

In addition to PN offsets, reference distances, and configuration codes, the neighbor list could also include other information. For example, the neighbor list could identify a PN increment, which represents the difference between successive PN offsets used in the wireless network. In the example of Table 1, the PN increment is 1. In other examples, the PN increment could be 2, 3, or some other value.

FIGS. 3-8 are flowcharts illustrating methods in which a mobile station selects a scanning algorithm and uses the scanning algorithm to determine whether to scan for a different-configuration sector (i.e., a neighbor sector that has a different frequency assignment than the mobile station's primary sector). For purposes of illustration, the methods will be described with reference to the configuration of wireless network 100 shown in FIG. 1 and the neighbor list information format shown in Table 1. It is to be understood, however, that other configurations and information formats could be used.

Figure 3:
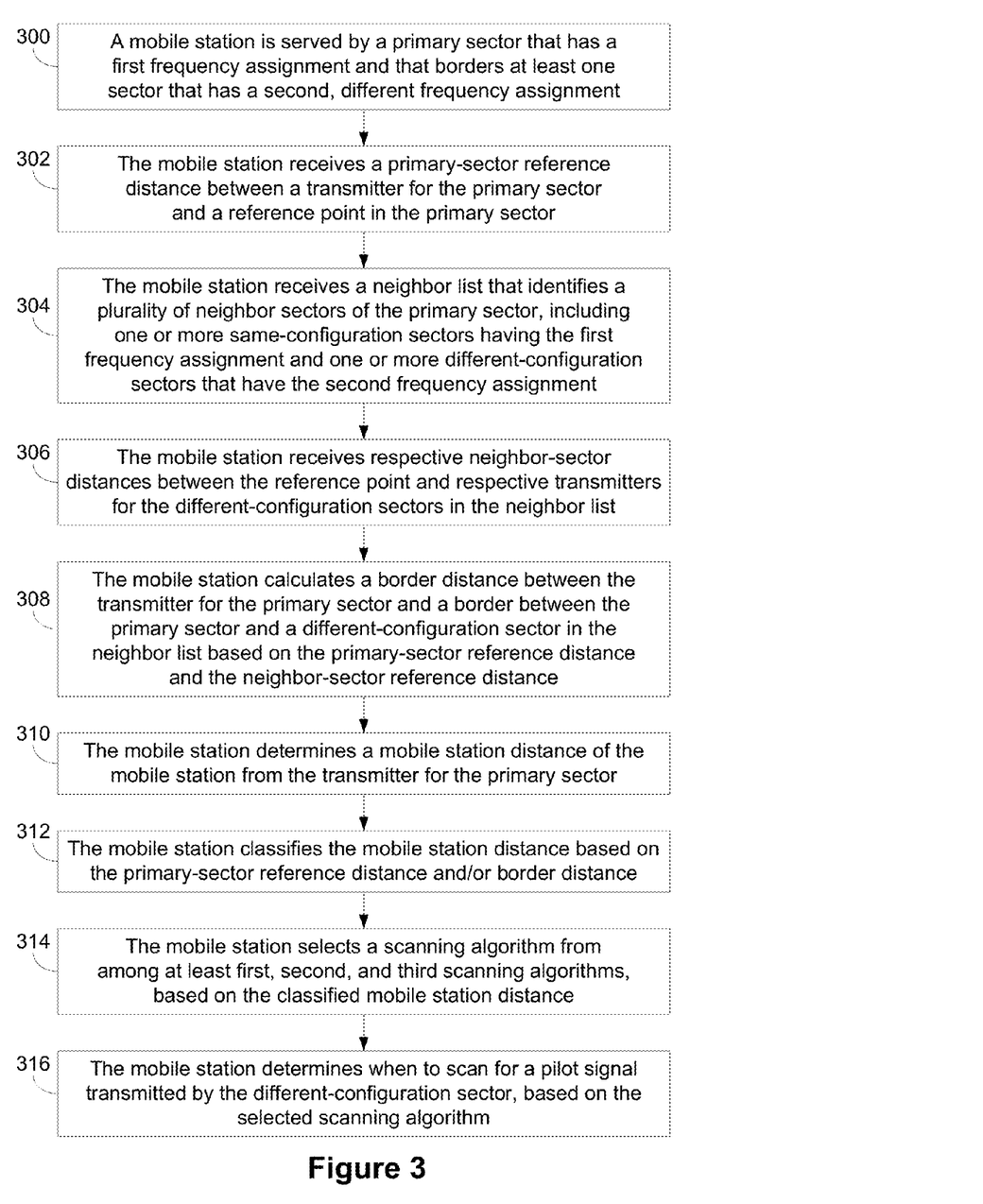
FIG. 3 is a flow chart illustrating a method for a mobile station, in accordance with an example embodiment.

With reference to FIG. 3, the method begins when a mobile station (e.g., mobile station 122) is served by a primary sector (e.g., sector 11) that has a first frequency assignment and that borders at least one sector that has a second, different frequency assignment, as indicated by block 300. The mobile station receives a primary-sector reference distance between a transmitter for the primary sector (e.g., BTS 108) and a reference point in the primary sector (e.g., reference point 124), as indicated by block 302. The mobile station receives a neighbor list that identifies a plurality of neighbor sectors of the primary sector, including one or more same-configuration sectors having the first frequency assignment and one or more different-configuration sectors that have the second frequency assignment, as indicated by block 304. The mobile station also receives respective neighbor-sector distances between the reference point and respective transmitters for the different-configuration sectors in the neighbor list, as indicated by block 306.

In one possible approach, the neighbor list that the mobile station receives from the primary sector could include all of the information described above for blocks 302, 304, and 306. For example, the neighbor list that the mobile station receives from the primary sector could include information as shown in Table 1. In this way, the neighbor list can provide the primary-sector reference distance, can indicate which of the neighbor sectors are different-configuration sectors, and can also provide neighbor-sector reference distances for the different-configuration sectors.

In the example of Table 1, neighbor-sector reference distances are provided for three different-configuration sectors (i.e., sectors 17, 21, and 24). The mobile station may consider each of these different-configuration sectors independently. As a result, the mobile station might select either the same scanning algorithm or different scanning algorithms for the three different-configuration sectors. For purposes of illustration, the process of selecting and applying a scanning algorithm is described below for a particular one of the different-configuration sectors, namely, sector 21. It is to be understood, however, that in addition to selecting and applying a scanning algorithm for sector 21, the mobile station could also select and apply respective scanning algorithms for the other different-configuration sectors, i.e., sectors 17 and 24.

Considering now a particular different-configuration sector in the neighbor list (sector 21), the mobile station calculates a border distance that corresponds to a distance between the transmitter for the primary sector (e.g., BTS 108) and a border between the primary sector and the different-configuration sector (e.g., border 120) based on the primary-sector reference distance and the neighbor-sector reference distance, as indicated by block 308. In one example, the border distance ($D_B$) may be calculated as an average of the primary-sector reference distance ($D_P$) and the neighbor-sector reference distance ($D_N$). Thus, the calculation could be: $D_B=(D_P+D_N)/2$. Given the information in Table 1, in which the transmitter for the primary sector is 4 chips away from the reference point and the transmitter for the different-configuration sector is 10 chips away, the border distance may be calculated as 7 chips away from the primary sector's transmitter. Other ways of calculating the border distance could be used as well.

The mobile station also determines a mobile station distance of the mobile station from the transmitter for the primary sector, as indicated by block 310. The mobile station may determine this distance by measuring the phase of a pilot signal transmitted by the primary sector. The phase difference between the phase of the pilot signal measured by the mobile station and the pilot signal's nominal phase (its PN offset) corresponds to the distance that the pilot signal propagated from the transmitter to the mobile station. Assuming direct line-of-sight propagation, the propagation distance that the mobile station determines by measuring the phase of the primary sector's pilot signal can be taken as the distance of the mobile station to the primary sector's transmitter. Alternatively or additionally, other methods for determining the mobile station distance could be used.

The mobile station then classifies the mobile station distance based on the primary-sector reference distance and/or border distance, as indicated by block 312. For example, the mobile station distance could be classified as being less than the reference distance, greater than the reference distance but less than the border distance, or greater than the border distance.

Based on the classified mobile station distance, the mobile station selects a scanning algorithm from among at least first, second, and third scanning algorithms, as indicated by block 314. Once the mobile station has selected a scanning algorithm, the mobile station determines when to scan for a pilot signal transmitted by the different-configuration sector based on the selected scanning algorithm, as indicated by block 316.

Figure 4:
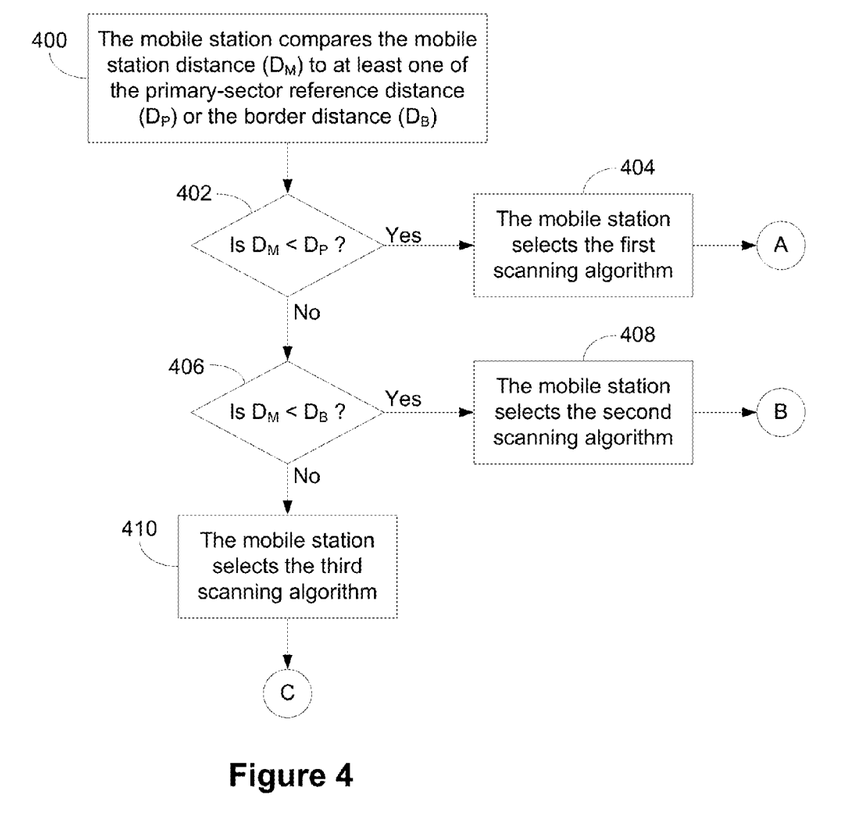
FIG. 4 is a flow chart further illustrating an aspect of the method of FIG. 3, in accordance with an example embodiment.

FIG. 4 illustrates an example method for selecting a scanning algorithm in more detail. The mobile station compares the mobile station distance ($D_M$) to at least one of the primary-sector reference distance ($D_P$) or the border distance ($D_B$), as indicated by block 400. In this example, the mobile station first determines whether $D_M < D_P$, as indicated by block 402. If the mobile station determines that $D_M < D_P$, then the mobile station selects the first scanning algorithm, as indicated by block 404, and the method proceeds to branch "A." Otherwise, the mobile station determines whether $D_M < D_B$, as indicated by block 406. If the mobile station determines that $D_M < D_B$, then the mobile station selects the second scanning algorithm, as indicated by block 408, and the method proceeds to branch "B." Otherwise, the mobile station selects the third scanning algorithm, as indicated by block 410, and the method proceeds to branch "C."

Although FIG. 4 illustrates an example in which the mobile station first compares $D_M$ to $D_P$, in other examples the mobile station could first compare $D_M$ to $D_B$. In still other examples, the mobile station could compare $D_M$ to one or more other values based on $D_P$ and/or $D_B$, or otherwise classify $D_M$ based on $D_P$ and/or $D_B$ in order to select a scanning algorithm.

Figure 5:
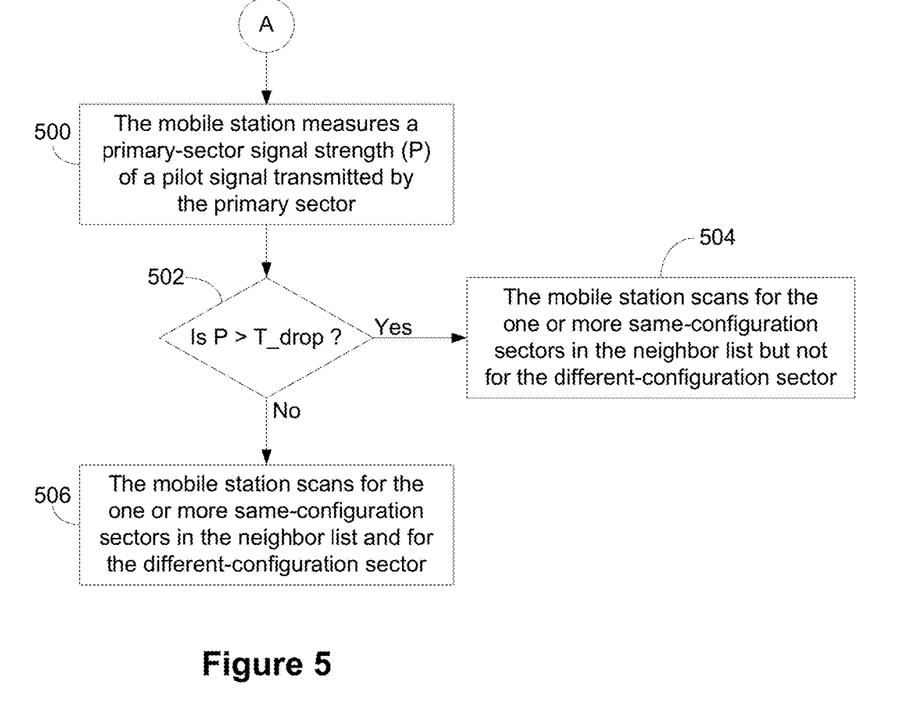
FIG. 5 is a flow chart illustrating a method in which a mobile station applies a first scanning algorithm, in accordance with an example embodiment.

FIG. 5 illustrates an example method corresponding to branch "A," in which the mobile station applies the first scanning algorithm that the mobile station selected for determining when to scan for the different-configuration sector. In this example, the mobile station measures a primary-sector signal strength (P) of a pilot signal transmitted by the primary sector, as indicated by block 500. The mobile station then determines whether P>T_drop, as indicated by block 502. If the mobile station determines that P>T_drop, then the mobile station scans for the one or more same-configuration sectors in the neighbor list but not for the different-configuration sector, as indicated by block 504. Otherwise, the mobile station scans for the one or more same-configuration sections in the neighbor list and for the different-configuration sector, as indicated by block 506.

As discussed above, T_drop is a threshold that can be used to determine when to drop a sector from a mobile station's active set. Thus, in the example of FIG. 5, the mobile station would scan for the different-configuration sector only when the signal strength of the primary sector has become low enough that the primary sector could be dropped from the mobile station's active set. This approach can beneficially avoid battery power consumption that may be associated with scanning for a different-frequency sector because instances in which the primary sector's signal strength fall below T_drop may be relatively infrequent. Since the mobile station is relatively close to the primary sector's transmitter (i.e., $D_M < D_P$), it is more likely that the mobile station will find that a different first-configuration sector has a higher signal strength than the primary sector, so as to become a new primary sector for the mobile station, than for the primary sector's signal strength to fall below T_drop.

Figure 6:
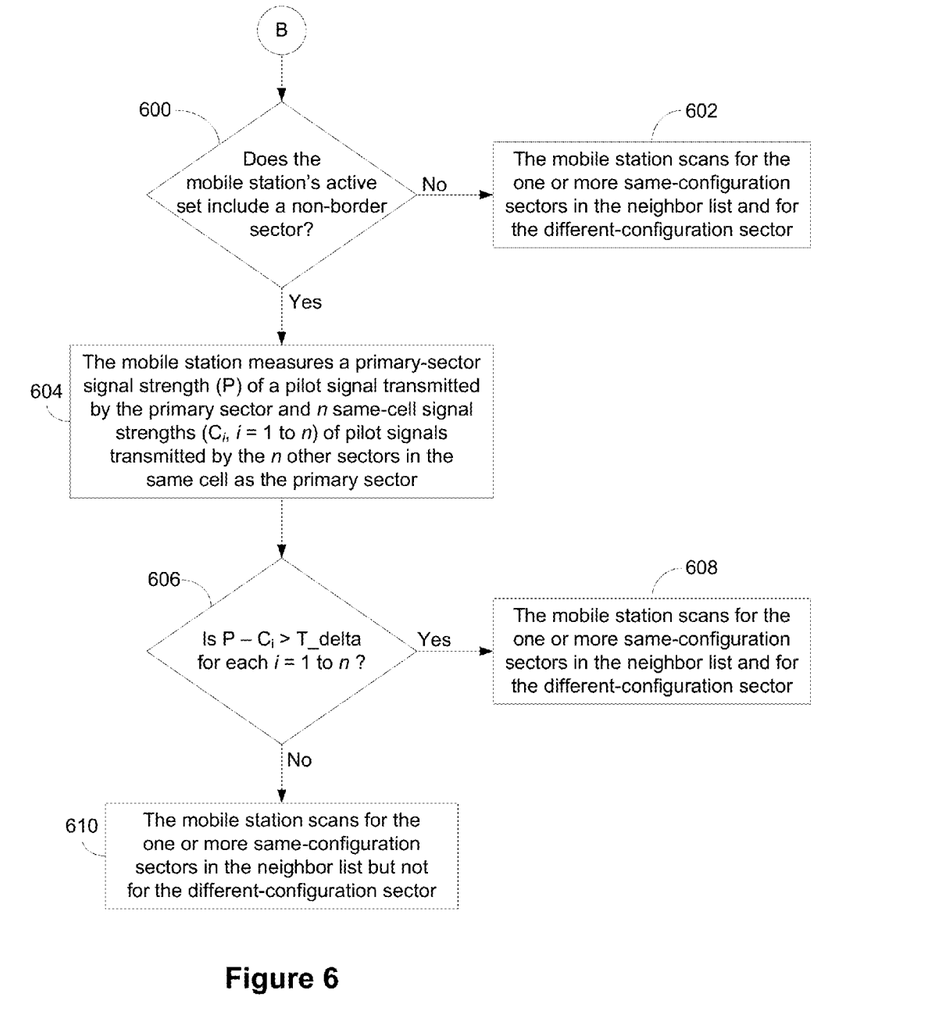
FIG. 6 is a flow chart illustrating a method in which a mobile station applies a second scanning algorithm, in accordance with an example embodiment.

FIG. 6 illustrates an example method corresponding to branch "B," in which the mobile station applies the second scanning algorithm that the mobile station selected for determining when to scan for the different-configuration sector. In this example, the mobile station determines whether the mobile station's active set includes a non-border sector, as indicated by block 600. If the mobile station's active set does not include a non-border sector (i.e., all of the sectors in the active set are border sectors), then the mobile station scans for the one or more same-configuration sectors in the neighbor list and for the different-configuration sector, as indicated by block 602.

If, on the other hand, the mobile station's active set includes at least one non-border sector, the mobile station measures a primary-sector signal strength (P) of a pilot signal transmitted by the primary sector and also measures n same-cell signal strengths ($C_i$, i=1 to n) of pilot signals transmitted by the n other sectors in the same cell as the primary sector, as indicated by block 604. The mobile station then determines whether P exceeds each $C_i$ by at least a predetermined amount (T_delta), i.e., whether P−$C_i$>T_delta, for each i=1 to n, as indicated by block 606. The predetermined amount (T_delta) could be based on the add threshold (T_add) and drop threshold (T_drop) values. In one example, T_delta=T_add−T_drop. It is to be understood, however, that the predetermined amount (T_delta) could be selected in other ways.

If P satisfies the criterion of block 606, then the mobile station scans for the one or more same-configuration sectors in the neighbor list and for the different-configuration sector, as indicated by block 608. If P does not satisfy the criterion of block 606, then the mobile station scans for the one or more same-configuration sectors in the neighbor list but not for the different-configuration sector, as indicated by block 610.

Thus, in the example of FIG. 6, the scanning algorithm considers how close the mobile station is to the border based on whether all of the sectors in the mobile station's active set are border sectors. If all of the sectors in the mobile station's active set are border sectors, then it is likely that the mobile station is close to the border and scanning for the different-configuration sector is justified. If there is a non-border sector in the mobile station's active set, then the scanning algorithm considers whether the distance classification that the mobile station determined for the mobile station distance (i.e., that $D_P<D_M<D_B$) is a result of the mobile station moving away from the primary sector's cell or a result of the mobile station moving from the primary sector to another sector in the primary sector's cell. Thus, a comparison of the signal strength from the primary sector to the signal strengths of the other sectors in the cell can be used to determine whether scanning for the different-configuration sector is justified.

Figure 7:
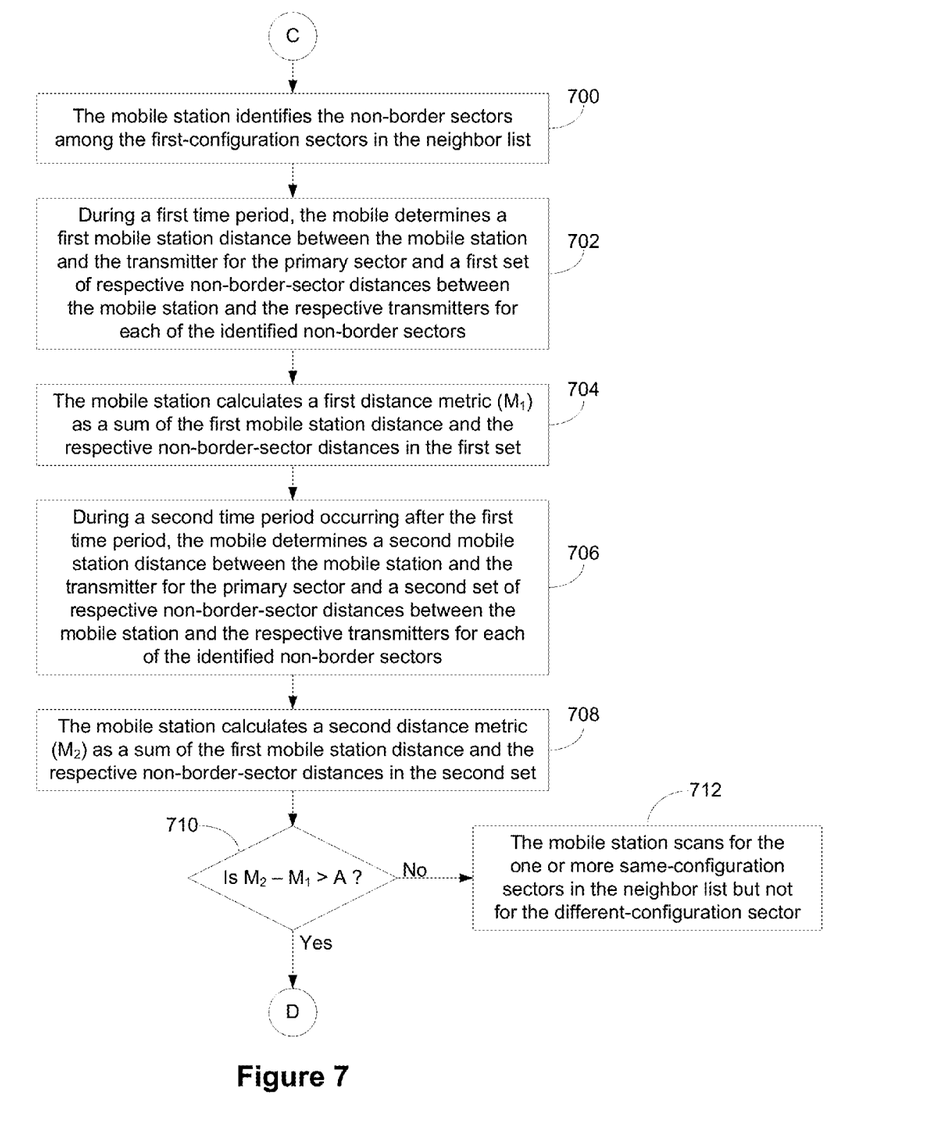
FIG. 7 is a flow chart illustrating a method in which a mobile station applies a third scanning algorithm, in accordance with an example embodiment.

FIG. 7 illustrates an example method corresponding to branch "C," in which the mobile station applies the third scanning algorithm that the mobile station selected for determining when to scan for the different-configuration sector. In this example, the third scanning algorithm determines whether the mobile station is moving toward the border or away from the border, based on how the mobile station's distance to interior (non-border) sectors changes over time. Thus, in this example, the mobile station identifies the non-border sectors among the first-configuration sectors in the neighbor list, as indicated by block 700.

During a first time period, the mobile station determines a first mobile station distance between the mobile station and the transmitter for the primary sector and a first set of respective non-border-sector distances between the mobile station and the respective transmitters for each of the identified non-border sectors, as indicated by block 702. The mobile station calculates a first distance metric ($M_1$) as a sum of the first mobile station distance and the respective non-border-distances in the first set, as indicated by block 704.

During a second time period occurring after the first time period, the mobile station determines a second mobile station distance between the mobile station and the transmitter for the primary sector and a second set of respective non-border-sector distances between the mobile station and the respective transmitters for each of the identified non-border sectors, as indicated by block 706. The mobile station calculates a second distance metric ($M_2$) as a sum of the second mobile station distance and the respective non-border-distances in the second set, as indicated by block 708. The mobile station may determine its distance with respect to these transmitters by, for example, measuring the phases of pilot signals from the transmitters. Other ways of determining the distances could also be used.

The mobile station then determines whether the second distance metric ($M_2$) is greater than the first distance metric ($M_1$) by at least a predetermined amount (A). Thus, the mobile station may determine whether $M_2-M_1>A$, as indicated by block 710. The predetermined amount (A) could be zero or any value that can be used to determine whether the mobile station's distance from the non-border sectors is generally increasing, such as may indicate that the mobile station is moving toward the border. If $M_2$ is not sufficiently greater than $M_1$ according to the criteria of block 710, then the mobile station scans for the one or more same-configuration sectors in the neighbor list but not for the different-configuration sector, as indicated by block 712. If $M_2$ is sufficiently greater than $M_1$ according to the criteria of block 710, then the method continues as shown in FIG. 8.

Figure 8:
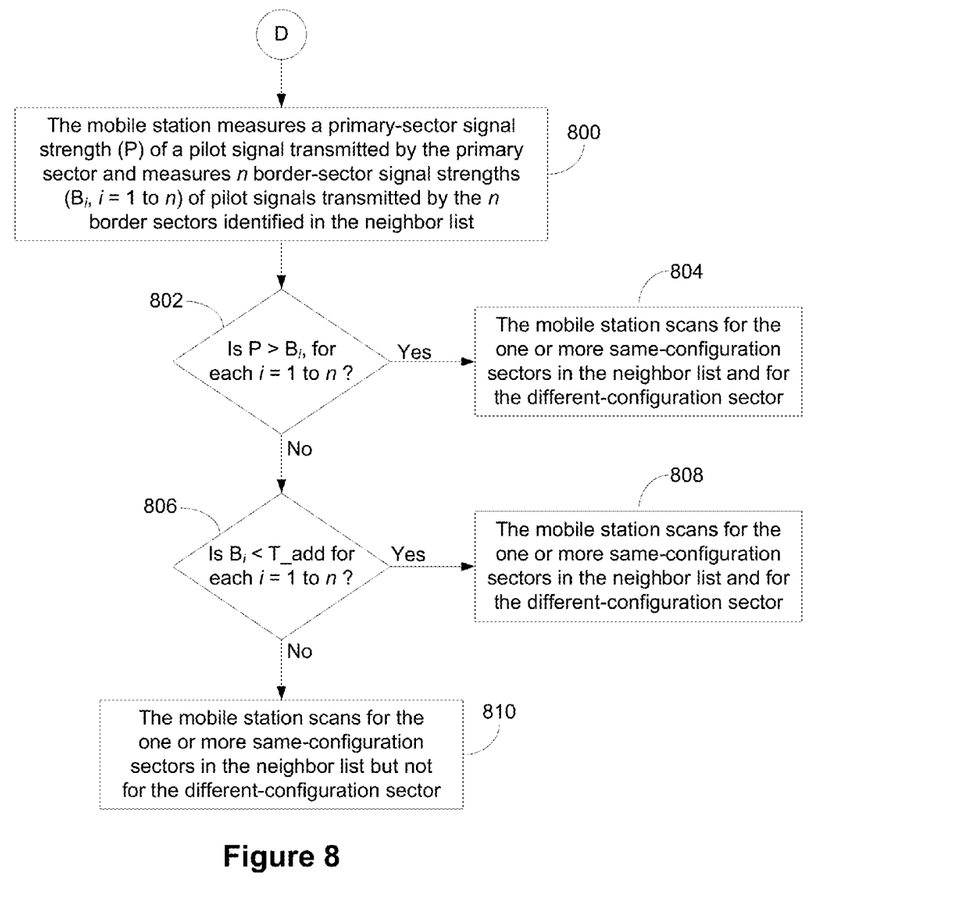
FIG. 8 is a flow chart further illustrating the method of FIG. 7, in accordance with an example embodiment.

In the example of FIG. 8, the scanning algorithm considers the signal strengths of the border sectors to determine whether scanning for the different-configuration sector is justified. The mobile station measures a primary-sector signal strength (P) of a pilot signal transmitted by the primary sector and n border-sector signal strengths ($B_i$, i=1 to n) of pilot signals transmitted by the n border sectors identified in the neighbor list, as indicated by block 800. The mobile station then determines whether $P>B_i$, for each i=1 to n, as indicated by block 802. If P satisfies the criterion of block 802, then the mobile station scans for the one or more same-configuration sectors in the neighbor list and for the different-configuration sector, as indicated by block 804.

If P does not satisfy the criterion of block 802, then the mobile station compares the $B_i$ values to the add threshold (T_add) to determine whether $B_i<T\_add$, for each i=1 to n, as indicated by block 806. If the $B_i$ values satisfy the criterion of block 806, then the mobile station scans for the one or more same-configuration sectors in the neighbor list and for the different-configuration sector, as indicated by block 808. If the $B_i$ values do not satisfy the criterion of block 806, then the mobile station scans for the one or more same-configuration sectors in the neighbor list but not for the different-configuration sector, as indicated by block 810. It is to be understood that the scanning algorithms described above with reference to FIGS. 5-8 are merely examples of the kinds of scanning algorithms that a mobile station may use to determine when to scan for a different-configuration sector. In other examples, a mobile station may apply other scanning algorithms that include different criteria based on signal strengths, distances, and/or other considerations. For example, a scanning algorithm may also take into consideration the mobile station's remaining battery capacity. In particular, a scanning algorithm may apply criteria that make scanning for the different-configuration sector more likely when the mobile station's remaining battery capacity is relatively high and/or make scanning for the different-configuration sector less likely when the mobile station's remaining battery capacity is relatively high low. Other variations are possible as well.

Further, while the methods described above provide for the mobile station distance being classified into one of three distance ranges and provide for the selection of a scanning algorithm from among three different scanning algorithms, other examples may provide for a greater or fewer number of distance ranges and/or provide for a greater or fewer number of scanning algorithms that can be selected.

4. Example Mobile Station

Figure 9:
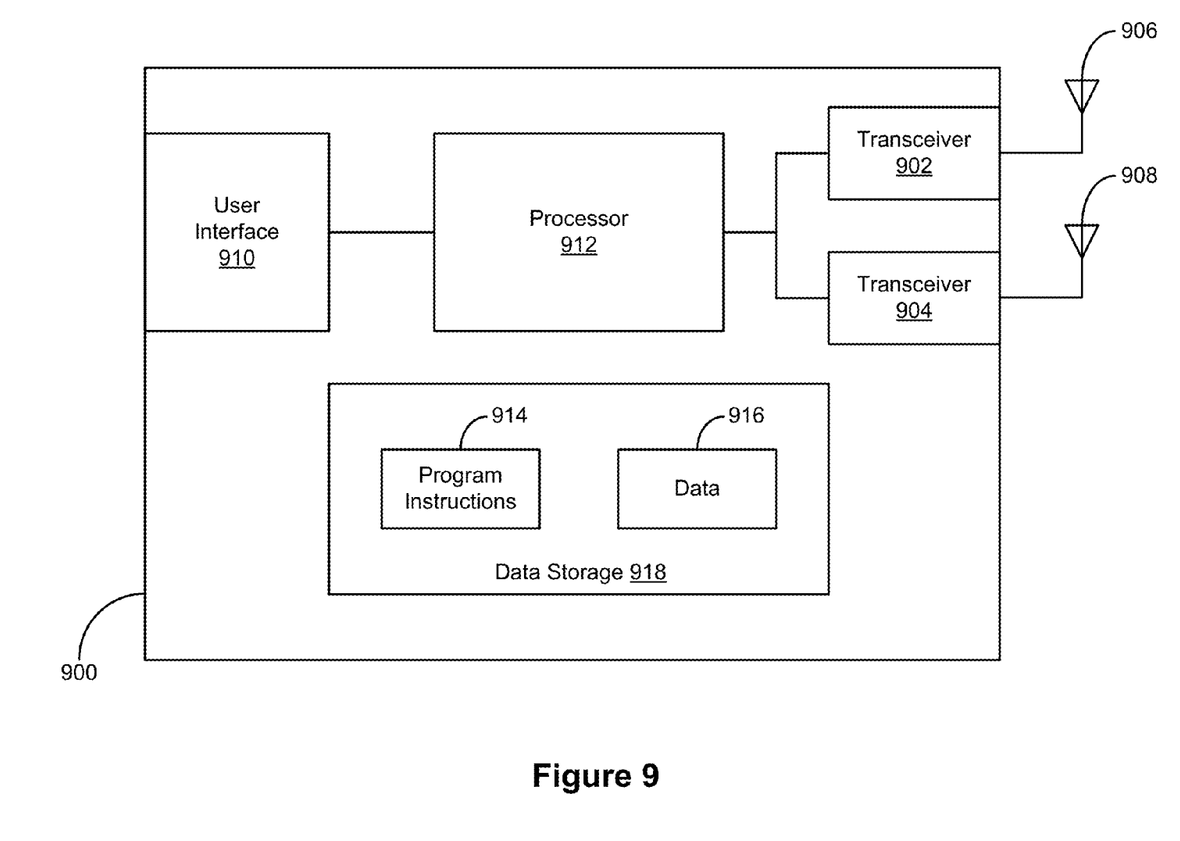
FIG. 9 is a block diagram of a mobile station, in accordance with an example embodiment.

FIG. 9 illustrates an example mobile station 900 that can be configured to perform any of the mobile station functions described herein, such as described above with reference to FIGS. 1-8. Mobile station 900 could be a wireless telephone, a wirelessly-equipped handheld, tablet, or laptop computer, or other type of wireless communication device.

In this example, mobile station 900 includes a first transceiver 902 and a second transceiver 904. First transceiver 902 includes a transmitter for transmitting signals in a first uplink frequency band and a receiver for receiving signals in a first downlink frequency band, via an antenna 906. Second transceiver 904 includes a transmitter for transmitting signals in a second uplink frequency band and a receiver for receiving signals in a second downlink frequency band, via an antenna 908. The first uplink and downlink frequency bands used by first transceiver 902 could correspond to frequencies in a first band class used in a wireless network, such as may be used by first-configuration sectors 1-15, and the second uplink and downlink frequency bands used by transceiver 904 could correspond to frequencies in a second band class used in the wireless network, such as may be used by second-configuration sectors 16-24. The signals transmitted by transceivers 902 and 904 could be spread spectrum signals, for example, in accordance with CDMA2000 standards. Alternatively, transceivers 902 and 904 could be configured to transmit and/or receive other types of signals.

Mobile station 900 also includes a user interface 910 configured to receive input from the user and to convey output from the user. For instance, user interface 910 may include a touch screen, a keypad, buttons, and or other controls for receiving input from the user. User interface 910 may also include a display screen for displaying textual and/or graphical information to the user. In addition, user interface 910 may include a microphone and speaker for voice communication.

The functioning of mobile station 900, including the functioning of transceivers 902, 904, and user interface 910, could be controlled by a processor 912, for example, by processor 912 executing program instructions 914 and using data 916 stored in data storage 918. Data storage 918 may include any type of non-transitory computer readable medium, such as random access memory (RAM), read-only memory (ROM), flash memory, cache memory, one or more magnetically encoded disks, one or more optically encoded disks, and/or any other type of volatile or non-volatile memory.

In one example, program instructions 914 are executable by processor 912 to: (a) receive a primary-sector reference distance between a transmitter for a primary sector serving the mobile station and a reference point in the primary sector, wherein the primary sector transmits spread spectrum signals in the first frequency band; (b) receive a neighbor-sector reference distance between the reference point and a transmitter for a different-configuration sector that borders the primary sector, wherein the different-configuration sector transmits spread spectrum signals in the second frequency band; (c) calculate a border distance between the transmitter for the primary sector and a border between the primary sector and the different-configuration sector based on the primary-sector reference distance and the neighbor-sector reference distance (e.g., as an average of the primary-sector reference distance and the neighbor-sector reference distance); (d) determine a mobile station distance of the mobile station from the transmitter for the primary sector (e.g., by causing the receiver in first transceiver 902 to measure the phase of a spread spectrum signal transmitted by the primary sector's transmitter); (e) classify the mobile station distance based on a comparison of the mobile station distance to at least one of the primary-sector reference distance or the border distance; (f) select a scanning algorithm from among at least a first scanning algorithm, a second scanning algorithm, and a third scanning algorithm, based on the classified mobile station distance; and (g) control the receiver in second transceiver 904 in accordance with the selected scanning algorithm.

5. Conclusion

While various example aspects and example embodiments have been disclosed herein, other aspects and embodiments will be apparent to those skilled in the art. The various example aspects and example embodiments disclosed herein are for purposes of illustration and are not intended to be limiting, with the true scope and spirit being indicated by the following claims.

What is claimed is:

1. A method for a wireless network, wherein the wireless network includes a plurality of first-configuration sectors that have a first frequency assignment and a plurality of second-configuration sectors that have a second, different assignment, and wherein the plurality of first-configuration sectors include a plurality of border sectors that border at least one of the second-configuration sectors and a plurality of non-border sectors that do not border any of the second-configuration sectors, the method comprising:
   determining that a primary sector serving a mobile station is one of the border sectors;
   transmitting to the mobile station a primary-sector reference distance corresponding to a distance between a reference point in the primary sector and a transmitter for the primary sector; and
   transmitting to the mobile station a neighbor list that identifies a plurality of neighbor sectors of the primary sector, wherein the plurality of neighbor sectors includes one or more first-configuration sectors and one or more second-configuration sectors; and
   transmitting to the mobile station, for each of the one or more second-configuration sectors, a respective neighbor-sector reference distance corresponding to a respective distance between the reference point in the primary sector and a respective transmitter for the second-configuration sector.

2. The method of claim 1, wherein the neighbor list indicates which of the one or more first-configuration sectors are border sectors and which of the one or more first-configuration sectors are non-border sectors.

3. The method of claim 1, wherein the neighbor list includes the respective neighbor-sector reference distances for each of the one or more second-configuration sectors.

4. The method of claim 1, wherein determining that a primary sector serving a mobile station is one of the border sectors comprises the wireless network detecting that the mobile station has moved from a non-border sector to a border sector.

5. The method of claim 4, wherein the wireless network transmits the primary-sector reference distance to the mobile station in response to detecting that the mobile station has moved from a non-border sector to a border sector.

6. The method of claim 1, wherein the wireless network is configured to transmit spread spectrum signals that are spread with a pseudo-noise (PN) code sequence at a chip rate.

7. The method of claim 6, wherein the primary-sector reference distance and the neighbor-sector reference distances are given as respective chip distances, wherein each chip distance corresponds to a distance traveled by the spread spectrum signals between successive chips in the PN code sequence.

8. The method of claim 6, wherein the neighbor list identifies each neighbor sector by a respective PN offset.

9. The method of claim 1, wherein each of the one or more first-configuration sectors are identified in the neighbor list by a first configuration code and each of the one or more second-configuration sectors are identified in the neighbor list by a second configuration code.

\* \* \* \* \*